United States Patent [19]

Bachell et al.

[11] Patent Number: 5,863,153

[45] Date of Patent: Jan. 26, 1999

[54] WASTE TREATMENT

[75] Inventors: Amanda Bachell, Leighton Buzzard; James Shahdad Azimraieyat, Milton Keynes; Andrew John Wheatley, Harrold; Paul Watson Wheeler, Stowe; Christopher William Huckle, Daventry, all of United Kingdom

[73] Assignee: Geohess (UK) Limited, Buckingham, England

[21] Appl. No.: 16,684

[22] Filed: Jan. 30, 1998

Related U.S. Application Data

[63] Continuation of Ser. No. 640,923, Oct. 9, 1996, abandoned.

[30] Foreign Application Priority Data

Nov. 9, 1993 [GB] United Kingdom ............... 9323091
Feb. 9, 1994 [GB] United Kingdom ............... 9402092

[51] Int. Cl.$^6$ .................... B09B 1/00; E02D 3/00
[52] U.S. Cl. .................... 405/129; 405/270
[58] Field of Search .................... 405/128, 129, 405/270; 210/401; 71/901

[56] References Cited

U.S. PATENT DOCUMENTS

| | | | |
|---|---|---|---|
| 3,586,624 | 6/1971 | Larson | 405/129 |
| 4,608,126 | 8/1986 | Watson et al. | 210/747 X |
| 4,810,131 | 3/1989 | Turner | 405/129 |
| 4,846,604 | 7/1989 | Holtmann | 405/128 |
| 4,909,667 | 3/1990 | DeMello | 405/128 |
| 4,973,196 | 11/1990 | Fuhr et al. | 405/129 |
| 5,201,609 | 4/1993 | Johnson | 405/129 |
| 5,259,697 | 11/1993 | Allen et al. | 405/129 |
| 5,304,014 | 4/1994 | Slutz | 405/129 |
| 5,564,864 | 10/1996 | Simpson et al. | 405/270 |

FOREIGN PATENT DOCUMENTS

| | | |
|---|---|---|
| 3641780 | 9/1987 | Germany . |
| 3809128 | 10/1989 | Germany . |
| 4114503 | 11/1992 | Germany . |
| 57-24710 | 5/1982 | Japan . |
| 58-33618 | 5/1983 | Japan . |
| 5125718 | 5/1993 | Japan . |
| 5329458 | 3/1994 | Japan . |
| 21679781 | 7/1986 | United Kingdom . |
| 2288598 | 10/1995 | United Kingdom . |
| 9216317 | 10/1992 | WIPO . |
| 9515825 | 6/1995 | WIPO . |

OTHER PUBLICATIONS

Curt Holman, "ADCs Conserve Space By Reusing Disposed Material", Sep. 1993, *Trends*.

Douglas K. Tucker, Alternative Daily Cover Materials For *Public Works*, pp. 62, 63, 72, 73, Dec. 1992, Public Works.

Bob Pell "Alternative Daily Cover Material", Jul. 1993, *Waste Age*, pp. 105–108.

Darlene Snow, "Alternative Daily Cover Material", Sep./Oct. 1994 *MSW Management*, pp. 53–59.

Brochure of ABG Limited (West Yorkshire, England) dated Jan. 1, 1996 Describing *EROSAMAT Type 1A*.

*Primary Examiner*—George Suchfield
*Attorney, Agent, or Firm*—Rankin, Hill, Porter & Clark LLP

[57] ABSTRACT

Landfill sites or other refuse deposits are temporarily covered by sheet material between successive filling or dumping operations. The sheet material may be left in place and more refuse deposited on top, or removed and re-used. The material is preferably woven, biodegradable and permeable, such as hessian. A number of sheets of the material may be placed together side-by-side and joined together such as by stitching, stapling or staking.

8 Claims, 2 Drawing Sheets

WASTE TREATMENT

CROSS REFERENCE TO RELATED APPLICATION

This is a continuation of Application Ser. No. 08/640,923, filed Oct. 9, 1996, now abandoned.

BACKGROUND OF THE INVENTION

The present invention relates to a method of covering waste, refuse or other material. The invention is applicable to the handling of waste, refuse or other material which is disposed of in areas such as landfill and land raising sites, waste and refuse establishments and mineral quarries.

It is current practice to provide daily cover for landfill sites at times when they are not actually being filed e.g. overnight. The covering is provided for several reasons including the following:
(i) to reduce odors from decaying waste;
(ii) to deter vermin, birds and flies;
(iii) to minimize wind-blown litter;
(iv) to improve the aesthetic appearance of the site.

At the moment, valuable non-renewable mineral resources are being used to provide this daily cover. Where clay is used, it is very lumpy and non-flexible making it almost impossible to lay it less than 200 mm deep to provide a reasonable cover. The next day's waste is deposited over the cover layer and thus layers of waste are separated by cover layers which can be impermeable. As a result they inhibit gases released by the decaying matter from migrating and these have to be removed in other ways.

A number of disadvantages arise from the use of minerals such as clay as daily cover, e.g.:
(i) a potentially valuable, non-renewable, mineral resource is wasted;
(ii) the material cannot readily be recovered and occupies valuable void which could otherwise be used, for example, for depositing refuse;
(iii) if the cover is impermeable it has the effect of dividing the landfill into relatively small, individual, sub-cells which makes long-term management difficult because the sub-cells will tend to behave as individuals and not en masse; and
(iv) if the daily cover is impermeable it will prevent the migration of fluids, gases and/or liquids and delay final stabilization of the site.

SUMMARY OF THE INVENTION

The present invention provides a method of covering waste, refuse or other material daily, the waste being placed in layers and a layer of woven or non-woven sheet material used to cover each layer and either left or removed before the next layer of waste is deposited.

The sheet material may be removed before the next layer of waste, refuse or other material is deposited so that it simply provides a temporary cover or it may be left and waste deposited on top thereby providing a stack comprising layers of waste separated by layers of sheet material. However, in the preferred embodiment of the invention the material may be removed and reused until such time as it is no longer in a condition where it is reusable, at which point it will be left on and the next layer of waste, refuse or other material placed on top.

The layers of sheet material are preferably permeable so that the gases and liquid, produced by the decaying material, can migrate rather than building up. For each layer of waste, a number of pieces of material may be used, preferably stitched or jointed together or fixed down. Thus, in the case of permeable material, escaping fluids or rainwater can migrate either through the material or from between the stitched or jointed pieces.

Alternatively, or additionally, the sheet material itself may be biodegradable. Given that the waste which the sheet is to contain is relatively large, the sheet material may be in the form of a net or mesh. It is generally preferable if the holes in the material are no larger than the average size of the material being covered or are small enough to prevent access by vermin, whichever size is the smaller, in the case of waste a maximum of about 12.5 mm (0.5 inches) might be best.

The new sheets of material are preferably dispensed from a roll which may be pulled by a tractor or other off-road vehicle which can be driven across the waste. A special implement for attachment to the vehicle either directly or indirectly on a towed sled or trailer may be designed for this purpose. Once used the material will be laid and removed using a bar to which the sheets will be attached and the bar pulled to and fro across the day's layer of waste or other material using either a machine such as a tractor or off-road vehicle or manpower.

The preferred sheet material which appears to be most appropriate is jute, which is biodegradable and relatively inexpensive. This can be dyed, soaked with water or treated with chemicals, as required. Other possibilities include material having similar properties to jute such as TARPOL (TM), Wavelock sheeting, p.v.c. netting, p.v.c. sheet, canvas matting and hessian.

The sheets of material, once laid, may be stitched or jointed together or fixed down at their edges and the material loaded down, as necessary, to prevent the sheets from being lifted. Such stitching, jointing or fixing will preferably be removable in order that the material can be re-used or re-positioned and then re-stitched, re-jointed or fixed down again.

BRIEF DESCRIPTION OF THE DRAWINGS

Certain embodiments of the invention will now be described by way of example only and with reference to the accompanying drawings in which.

DESCRIPTION OF THE PREFERRED EMBODIMENT

Waste and refuse is frequently deposited in large holes in the ground, these are commonly referred to as landfill sites. The landfill site shown in FIG. 1 comprises a hole 1 which is lined with an impermeable linear 2 (not to scale). The site may cover an area of many hectares.

Figure 1:
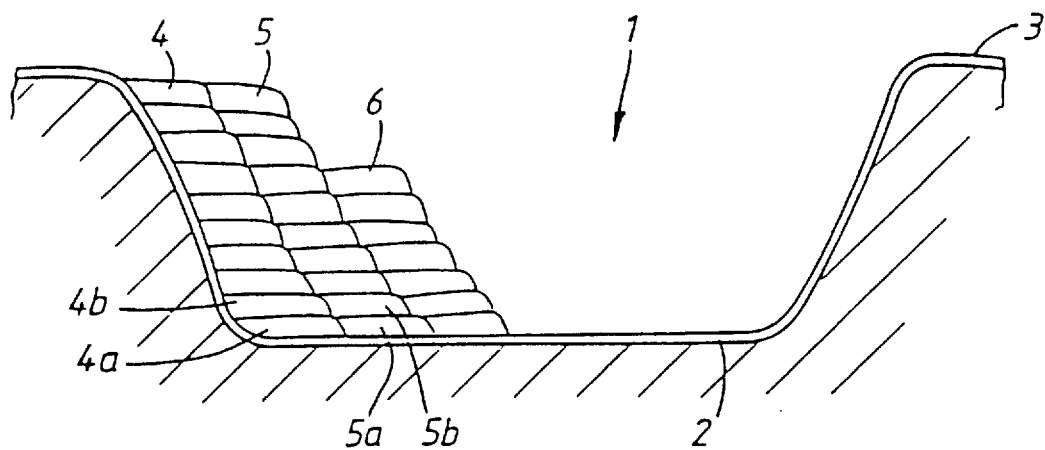
FIG. 1 is a cross sectional view of a landfill site being filled according to the method of the invention.

For the purpose of filing, the area of the hole 1 is divided into smaller areas known as cells. Each cell is usually built up layer by layer to the ground level 3 before the next cell is filled. Each layer is commonly referred to as a "lift". Thus, a cell consists of vertically adjacent lifts. FIG. 1 shows two full cells, 4 and 5, and a third cell, 6 being filled. Cell 4 is made up of lifts 4a, 4b etc., cell 5 is made up of lifts 5a, 5b etc.

Figure 2:
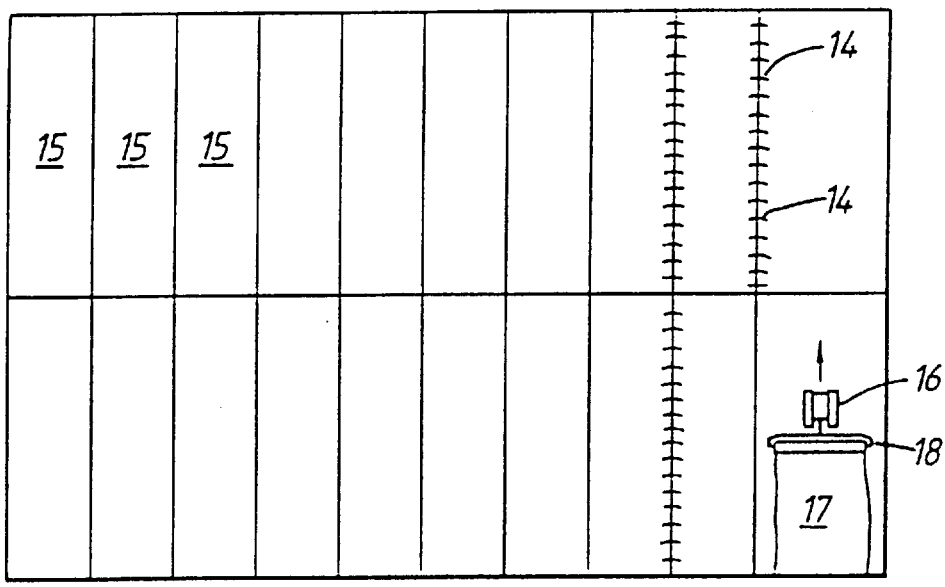
FIG. 2 is a top plan view of part of the landfill site of FIG. 1.

Each cell is covered with a layer of sheet material overnight whilst it is being filled, this is preferably removed before the next day's waste layer is deposited. A typical day's waste layer might be about 2 m deep. FIG. 2 is a top plan view of one cell with its overnight cover. The cover consists of several rectangular sheets 15 of jute matting, for example, laid edge to edge, such edges then pulled together to allow a lap required for stitching, jointing or fixing down. A vehicle 16 is shown dispensing the last sheet 17 from a large roll 18 which it is towing or carrying. When the last sheet has been laid the vehicle leaves and in most circumstances it is preferable that the vehicle does not drive over the cover material.

The adjoining edges of each sheet will be either held together and machine stitched, jointed or fixed down 14 to provide total coverage of the day's waste layer and prevent each separate sheet of material from moving. Such stitching will be done preferably using a hand held industrial sewing machine and potentially mechanically laid and sewn automatically. Such stitching will be easily removable and the material simply re-sewn, re-jointed or fixed down the next time the sheets are placed over the waste.

Figure 3:
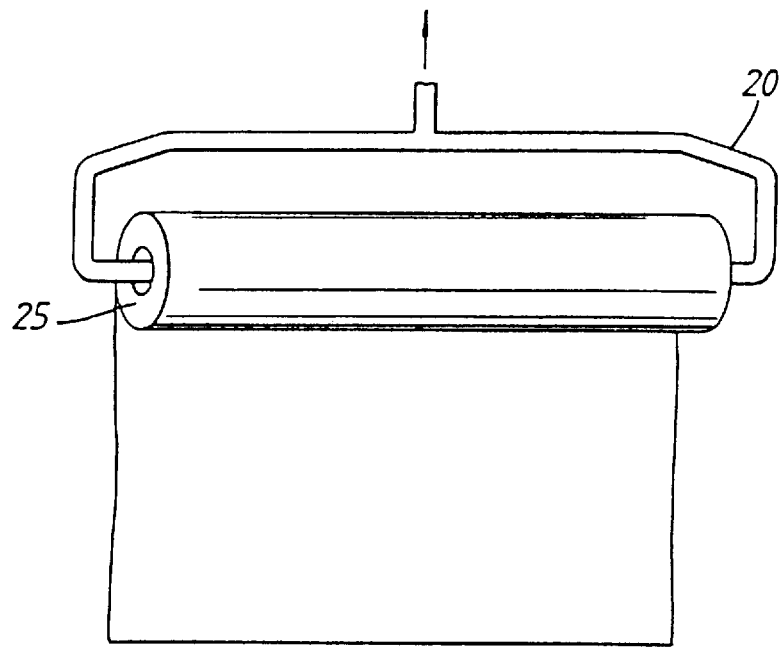
FIG. 3 shows a dispenser for the sheet material.

FIG. 3 shows a sheet material dispenser which may be used in connection with the invention. This consists of a large frame 20 on which the material roll 25 is rotatably mounted. The free edge of the material 17 may be held down so that as the roll is moved in the direction of arrow 'X' the material unwinds.

The dispenser is designed to be towed or carried by a vehicle, or mounted on a sled or trailer.

Figure 4A:
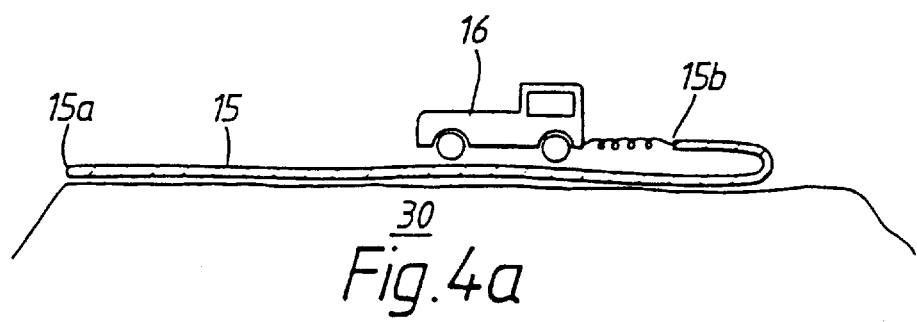
FIG. 4 illustrates a method of laying and removing the material.
Figure 4B:
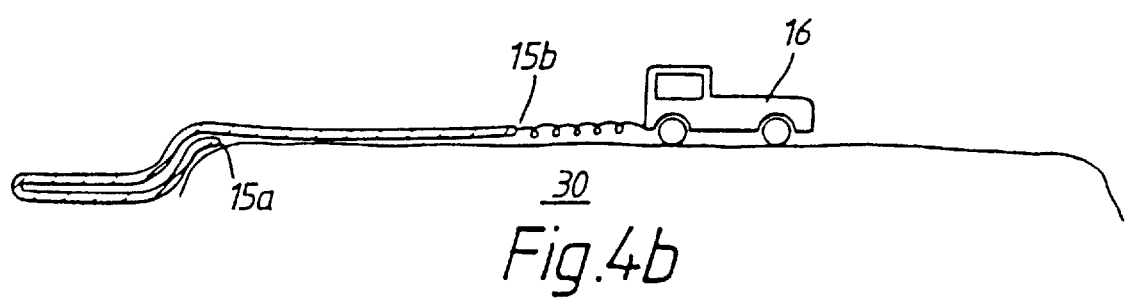

The use of material dispensed from a roll is suitable when the material is new. If the material is to be taken up between layers of waste, refuse or other material, it may simply be attached to a bar at one edge and drawn across the surface of the waste, as shown in FIG. 4. A sheet 15 is pegged or otherwise secured at one edge 15a and attached to a bar at its opposite edge 15b so that it can be drawn across the surface of the waste 30 to position it (FIG. 4(b)) or drawn back across itself to take it up (FIG. 4(a)). The material in this case must be fairly strong but it should be borne in mind that the occasional hole made by the vehicle or the underlying waste, refuse or other material will not be a problem since the sheet can be repaired by stitching or other suitable means and is intended to be permeable anyway.

When a landfill site is completely full it is usually covered with a layer of impermeable material This could be a natural cap made from a material such as clay with a low permeability or high density polyethylene, followed by soil, so that the area can be re-used, for example as agricultural land. This material, usually known as "capping" material, has to be of low permeability so that it reduces rainfall infiltration into the site and prevents gas migration. It must be of very high quality and strength so that vehicles can drive over it without causing damage, and it must not be biodegradable. In contrast, the material used for the intermediate covering of the present invention is not required to have any of these properties.

Whilst the above description refers specifically to landfill sites, it will be appreciated that the invention is equally applicable to other waste disposal methods including land raising as well as mineral quarries and other areas of loose material where short term protection is required.

We claim:

1. A method of operation of a landfill site, the method comprising the steps of
    (a) depositing a layer of refuse,
    (b) covering an upper surface of the layer of refuse with a layer of hessian,
    (c) removing the layer of hessian after a period of time,
    (d) depositing another layer of refuse on the previously deposited layer of refuse, and subsequently repeating steps (b), (c) and (d).

2. A method as claimed in claim 1, in which the layer of hessian is formed by laying a plurality of sheets of hessian side-by-side.

3. A method as claimed in claim 2, in which the side-by-side sheets of hessian are joined together.

4. A method as claimed in claim 3, in which the sheets of hessian are joined together by stitching.

5. A method as claimed in claim 3, in which the sheets of hessian are joined together by stapling.

6. A method as claimed in claim 3, in which the sheets of hessian are joined together by pegs which penetrate the refuse.

7. A method as claimed in claim 3, in which the sheets of hessian are unjoined before removal.

8. A method of operation of a landfill site, the method comprising the steps of:
    (a) depositing a layer of refuse,
    (b) covering an upper surface of the layer of refuse with a layer of hessian,
    (c) leaving the layer of hessian exposed for a period of time,
    (d) depositing another layer of refuse over the layer of hessian,
    (e) repeating steps (b), (c) and (d) until the land fill site is filled, and
    (f) depositing a layer of capping material.

* * * * *